Figure 2:
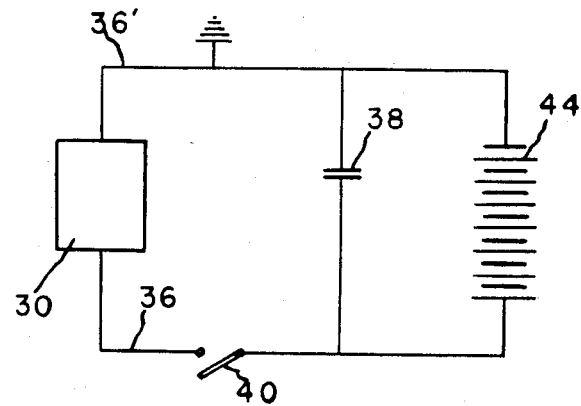

United States Patent

[11] 3,614,202

| [72] | Inventor | Eugene C. Letter<br>Penfield, N.Y. |
|---|---|---|
| [21] | Appl. No. | 335,695 |
| [22] | Filed | Jan. 3, 1964 |
| [45] | Patented | Oct. 19, 1971 |
| [73] | Assignee | Bausch & Lomb Incorporated<br>Rochester, N.Y. |

[54] ELECTRICALLY ACTUATED SHUTTER
5 Claims, 2 Drawing Figs.

[52] U.S. Cl. ............... 350/160, 350/312
[51] Int. Cl. ............... G02f 1/34
[50] Field of Search ............... 88/61; 89/61

[56] References Cited
UNITED STATES PATENTS

| 2,986,982 | 6/1961 | Kaprelian | 88/61 A |
| 3,008,374 | 8/1961 | Kreisman | 88/61 J |

OTHER REFERENCES

" Electronic Shutter Closes Rapidly" Electronics Vol. 29, Issue 6, pp. 194 and 196. June, 1956 (Copy in Group 260; 88–61J)

*Primary Examiner*—Verlin R. Pendegrass
*Attorneys*—Frank C. Parker and David E. Dougherty

CLAIM: 1. A reversible high-speed shutter comprising an optical element disposed at an angle greater than the critical angle of internal reflection with respect to an incident light ray, a condensable vapor adjacent said element, means producing a shock wave to thereby condense said vapor to a liquid changing the reflective characteristics of the shutter, and means vaporizing the condensed liquid to thereby return the shutter to its original condition.

PATENTED OCT 19 1971          3,614,202

EUGENE C. LETTER
INVENTOR.

BY Frank C. Parker
David Dougherty
ATTORNEYS 3,614,202

ELECTRICALLY ACTUATED SHUTTER

This invention relates to an optical shutter and more particularly to a reversible optical shutter for high-speed applications.

Studies of combustion, corona discharge, explosions, plastic and elastic deformation and shock wave phenomena frequently call for detailed photographs taken at shutter speeds of a few microseconds. Ballistics dynamic testing and chemical reactions also require pictures taken at similar speeds. At these relatively high speeds, it is also desirable to shutter a relatively large aperture. For example, a relatively large aperture allows adequate light to enter the optical system during the relatively short time intervals.

A high-speed optical shutter according to the present invention may be opened or closed in less than 100 microseconds. In some cases the opening or closing speed approaches 50 microseconds. Accordingly a system of this type may be used in combination with framing cameras. Further, because of the relatively large aperture which can be opened and closed at high speed, the devices are particularly applicable in any area requiring a relatively high-speed light valve. Additionally, a shutter or light valve according to the invention may be triggered by an event itself. For example, a flash of light may be used to trigger the valve or electronic means may be incorporated for that purpose.

The operation of a shutter according to the present invention is based upon the principle of critical reflection. This well-known principle is explained in some detail in the text "Principles of Optics" by A. C. Hardy and F. H. Perrin (1932) pp. 26 and 28 as well as in numerous other optical text books.

Briefly, a high-speed optical shutter according to the present invention includes an optical element such as a fused silica plate or prism which is disposed in a light path at an angle greater than the critical angle with respect to an incident light ray. A compressible vapor such as carbon tetrachloride is disposed adjacent the plate and means are provided for condensing the liquid to thereby change the reflective characteristics of the device.

Figure 1:
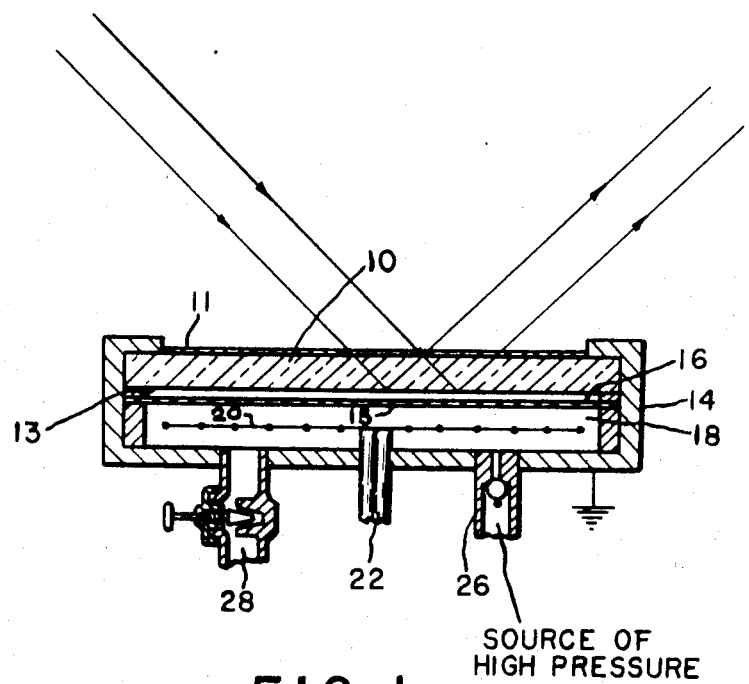

The invention will now be described in more detail in connection with the accompanying drawings; in which, FIG. 1 is a cross-sectional view of a high-speed optical shutter according to the present invention; and, FIG. 2 is a schematic diagram showing electrical means for opening or closing the shutter shown in FIG. 1.

A presently preferred embodiment of the invention is shown in FIG. 1. The device shown therein includes an optical element or mirror 10 having an antireflective coating 11 for a 45° angle of incidence on one surface thereof. The element is so constructed and arranged that the back surface 13 of the element 10 is disposed at an angle greater than the critical angle with respect to an incident light ray. Accordingly, a light ray incident thereupon will be totally reflected. According to the preferred embodiment, the element 10 comprises a relatively low index glass or fused silica plate having an index of refraction $n_D$ of about 1.458.

The element 10 is disposed in a grounded case or housing 14. The case defines a hollow reservoir which is separated into two portions by a thin membrane 15. The two portions comprise a vapor reservoir 16 and a fluid or liquid reservoir 18. The vapor reservoir 16 is relatively small with respect to the fluid reservoir 18 or with respect to the thickness of the element 10. It has, for example, been found desirable to separate the membrane 15 from the back surface 13 of the element 10 by a distance less than one sixty-fourth of an inch in a device having a free aperture of approximately ⅜ inch to 1 inch. The membrane 15 may comprise a relatively thin sheet of elastomer or rubber which forms an optically absorbing medium. An electrode 20 or grid is disposed in the liquid reservoir 18 and is connected to means for producing an electrical discharge by an insulated electrical conductor 22. The conductor 22 passes through the grounded case 14. The liquid reservoir 18 is connected to a source of high pressure through a check valve 26 which seals the liquid reservoir from a high-pressure supply. A valve 28 also connects the reservoir 18 to the outside atmosphere.

The schematic diagram in FIG. 2 shows a grid 30 connected by leads 36, 36′ in parallel with a capacitor 38 when a switch 40 is closed. The capacitor 38 is connected by the leads 42 to electrical means 44 for producing a high-voltage electrical discharge between 5,000 and 10,000 volts. The capacitor 38 has a capacitance of between 1/10 and 2 microfarads, and, according to a preferred embodiment of the invention, has a capacitance of about 1.0 microfarads. The capacitor is charged by the high-voltage supply 44 and discharges across the grid 30 when the switch 40 is closed. The electric discharge passing through the grid 30 creates a shock wave in the liquid which is disposed in the reservoir 18. It has been found, for example, that a 5,000 volt source and a 1.0 microfarad capacitor produces an adequate shock wave to shutter a ¾ inch diameter aperture in about 200 microseconds. A 10,000 volt source with a 1.0 microfarad capacitor would close a similar aperture in about 100 microseconds. Generally, an increase in aperture size would require a corresponding increase in capacitance. When the shutter is in an open condition, the light rays incident upon the element 10 pass through the antireflective coating 11 and are totally reflected by the back surface 13 of the element 10. As illustrated, the element 10 is disposed at about 45°, or at an angle slightly greater than the critical angle, between an incident light ray and the surface of the element 10, however, it should be understood that other angles could be used by properly selecting materials.

A compressible vapor, such as carbon tetrachloride, is contained in the reservoir 16 and in the case of carbon tetrachloride is maintained in a vaporous state by raising the temperature of the device to a temperature slightly above room temperature. The carbon tetrachloride was selected for the preferred embodiment in view of the similarity of its refractive index to the index of the glass. For example, the index of carbon tetrachloride is about 1.463 while the optical element has an index of about 1.458. Generally, the index of the liquid should be approximately equal to the index of the element.

In order to close the shutter the valve 28 is closed and the reservoir 18 is filled with a liquid such as distilled water. An electric discharge is produced by closing the switch 40 (shown in FIG. 2). The electric discharge produces a shock wave which travels through the liquid and strikes the optically absorbing membrane 15 to thereby force the membrane 15 into contact with the back surface 13 of the element 10. The shock wave compresses the vaporous carbon tetrachloride and raises the temperature thereof. The element 10 acts as a heat sink and allows the heat to dissipate which causes the vaporous fluid to condense on the surface 13 of the element 10 thereby forming an "optical continuum" between the optically absorbing membrane 15 and the element 10. Under these conditions the light incident upon the surface 13 is absorbed instead of being reflected. The term "optical continuum" has been used to describe the condition wherein there is optical continuity between the various elements.

The high-voltage discharge in the liquid medium increases the pressure in the fluid chamber 18. This pressure increase opens the valve 26 and allows the source of high pressure to build up and maintain a state of high pressure in the reservoir. The high pressure maintained should be in the order of 1,000 to 2,000 p.s.i. for the presently preferred embodiment of the invention. The membrane 15 is thereby held against the surface 13 of the element 10. Opening the valve 28 allows the pressure in the fluid reservoir 18 to drop, thereby allowing the membrane 15 to return to its normal position. This also allows the condensed carbon tetrachloride to vaporize and return the shutter to its first operative position, that is, a reflective condition.

While a preferred embodiment of the invention has been illustrated in the specification, it will be understood that this form is shown for purposes of illustration. The illustrated form

What is claimed is:

1. A reversible high-speed shutter comprising an optical element disposed at an angle greater than the critical angle of internal reflection with respect to an incident light ray, a condensable vapor adjacent said element, means producing a shock wave to thereby condense said vapor to a liquid changing the reflective characteristics of the shutter, and means vaporizing the condensed liquid to thereby return the shutter to its original condition.

2. A reversible high-speed shutter according to claim 1 in which the means producing a shock wave includes a capacitor, a source of high voltage and connecting means including a switch for connecting the capacitor, the source of high voltage and the shutter for discharging said capacitor to thereby produce a shock wave.

3. The reversible high-speed shutter according to claim 1 including a reservoir containing said vapor, a membrane, a second reservoir adjacent said vapor-containing reservoir and separated therefrom by said membrane, a liquid contained by said second reservoir and a pair of electrodes disposed in said liquid, said electrodes connected to the capacitor through the switch whereby closing the switch produces a shock wave which is transmitted through the liquid to compress the vapor and force the membrane against the surface of the optical element.

4. An optical element according to claim 3 in which the membrane comprises optically absorbing material, and which includes means maintaining the membrane against the surface of said element and in contact with the condensed vapor.

5. A reversible high-speed shutter according to claim 4 in which the optical element comprises fused silica and the condensable vapor comprises carbon tetrachloride.